United States Patent
Tao et al.

(10) Patent No.: US 7,045,271 B2
(45) Date of Patent: May 16, 2006

(54) ON PRESS DEVELOPABLE IMAGEABLE ELEMENT

(75) Inventors: Ting Tao, Fort Collins, CO (US); Heidi Munnelly, Windsor, CO (US); Scott Beckley, Windsor, CO (US); Kevin Wieland, Greeley, CO (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/842,111

(22) Filed: May 10, 2004

(65) Prior Publication Data

US 2005/0250040 A1 Nov. 10, 2005

(51) Int. Cl.
*G03F 7/038* (2006.01)
*G03F 7/20* (2006.01)
*G03F 7/30* (2006.01)

(52) U.S. Cl. .................. 430/271.1; 430/302; 430/944; 526/279

(58) Field of Classification Search .............. 430/270.1, 430/271.1, 302, 944, 905, 910; 526/279, 526/266, 268
See application file for complete search history.

(56) References Cited

U.S. PATENT DOCUMENTS

| | | | |
|---|---|---|---|
| 4,873,298 A | 10/1989 | Ryntz et al. | |
| 4,886,852 A | 12/1989 | Numa | |
| 5,306,765 A | 4/1994 | Kuriyama et al. | |
| 5,364,901 A | 11/1994 | Nield et al. | |
| 5,708,093 A | 1/1998 | Bastelberger et al. | |
| 5,712,340 A | 1/1998 | Gyotoku et al. | |
| 6,354,209 B1 | 3/2002 | Van Aert et al. | |
| 6,582,882 B1 | 6/2003 | Pappas et al. | |
| 2003/0064318 A1 | 4/2003 | Huang et al. | |
| 2003/0118849 A1 | 6/2003 | Yamasaki et al. | |
| 2003/0129520 A1 | 7/2003 | Oohashi et al. | |

FOREIGN PATENT DOCUMENTS

EP   1 114 734 A1 * 7/2001

OTHER PUBLICATIONS

E. Bourgeat-Lami, I. Tissot, and F. Lefebvre, Synthesis and Characterization of SiOH-Functionalized Polymer Latexes Using Methacryloxy Propyl Trimethoxysilane in Emulsion Polymerization; Macromolecules, 2002, 35, 6185-6191, Published on Web Jun. 26, 2002.

I. Tissot, J.P. Reymond, F. Lefebvre, and E. Bourgeat-Lami; SiOH-functionalized Polystyrene Latexes. A step toward the Synthesis of Hollow Silica Nanoparticles; Chem. Mater., 2002, 14, 1325-1331, Published on Web Feb. 13, 2002.

* cited by examiner

*Primary Examiner*—Sin Lee
(74) *Attorney, Agent, or Firm*—J. Lanny Tucker

(57) ABSTRACT

Co-polymers that contain siloxane groups, imageable elements that comprise the co-polymers, and methods for forming images by imaging and developing the imageable elements are disclosed. The imageable elements are useful as lithographic printing plate precursors that can be developed with water or with fountain solution.

27 Claims, No Drawings

ON PRESS DEVELOPABLE IMAGEABLE ELEMENT

FIELD OF THE INVENTION

The invention relates to lithographic printing. In particular, this invention relates to imageable elements useful as lithographic printing plate precursors that can be developed with water or with ink and/or fountain solution.

BACKGROUND OF THE INVENTION

In conventional or "wet" lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically, the ink is first transferred to an intermediate blanket, which in turn transfers the ink to the surface of the material upon which the image is to be reproduced.

Imageable elements useful as lithographic printing plate precursors typically comprise an imageable layer applied over the hydrophilic surface of a substrate. The imageable layer includes one or more radiation-sensitive components, which may be dispersed in a suitable binder. Alternatively, the radiation-sensitive component can also be the binder material. Following imaging, either the imaged regions or the unimaged regions of the imageable layer are removed by a suitable developer, revealing the underlying hydrophilic surface of the substrate. If the imaged regions are removed, the precursor is positive working. Conversely, if the unimaged regions are removed, the precursor is negative working. In each instance, the regions of the imageable layer (i.e., the image areas) that remain are ink-receptive, and the regions of the hydrophilic surface revealed by the developing process accept water and aqueous solutions, typically a fountain solution, and repel ink.

Conventional imaging of the imageable element with ultraviolet and/or visible radiation was carried out through a mask, which has clear and opaque regions. Imaging takes place in the regions under the clear regions of the mask but does not occur in the regions under the opaque regions. However, direct digital imaging, which obviates the need for imaging through a mask, is becoming increasingly important in the printing industry. Imageable elements for the preparation of lithographic printing plates have been developed for use with infrared lasers.

Imaged imageable elements typically require processing in a developer to convert them to lithographic printing plates. Developers are typically aqueous alkaline solutions, which may also contain substantial amounts of organic solvents. Because of their high pH and the presence of organic solvents, disposal of substantial quantities of used developer is expensive and can cause environmental problems. Processing of the imaged imageable element in a developer also introduces additional costs in, for example, the cost of the developer, the cost of the processing equipment, and the cost of operating the process. Imageable elements that can be developed with water, rather than with an aqueous alkaline developer, would avoid the cost of the developer and the problems associated with its disposal.

On-press developable lithographic printing plate precursors can be directly mounted on a press after imaging and developed with ink and/or fountain solution during the initial press operation. These precursors do not require a separate development step before mounting on press. On press imaging, in which the precursor is both imaged and developed on press, eliminates mounting the precursor in a separate imaging device. Thus, a need exists for imageable elements useful as lithographic printing plate precursors that can be developed in water or with ink and/or fountain solution. Preferably, development can be carried out on press to avoid a separate development step.

SUMMARY OF THE INVENTION

In one aspect, the invention is a co-polymer comprising x wt % of $A^1$ units, based on the weight of the co-polymer, y wt % of $A^2$ units, based on the weight of the co-polymer, and z wt % of C units, based on the weight of the co-polymer, in which:

x is about 30 wt % to about 98 wt %, y is about 1 wt % to 50 wt %; z is about 1 wt % to about 50 wt %, and x+y+z is about 100%;

(i) $A^1$ is selected from —[$CH_2$—$C(R^1)R^2$]—, —[$CH_2$—$CR^1(CO_2R^3)$]—, —[—(CH—CO—Y—CO—CH)—]—, and mixtures thereof;

(ii) $A^2$ is —[$CH_2$—$C(R^1)(CO_2B_nT)$]—; and (iii) C is —[$CH_2$—$(R^1)(W—R^5)$]— each $R^1$ is independently hydrogen, alkyl of one to six carbon atoms, phenyl, substituted phenyl, halogen, cyano, or a mixture thereof;

$R^2$ is hydrogen, alkyl of one to six carbon atoms, phenyl, substituted phenyl, halogen, alkoxy of one to four carbon atoms, acyl of one to five carbon atoms, acyloxy of one to five carbon atoms, allyl, or a mixture thereof;

Y is —O— or —$N(R^7)$—, in which $R^7$ is phenyl, substituted phenyl, alkyl of one to six carbon atoms, benzyl, or a mixture thereof;

$R^3$ is hydrogen, alkyl of one to six carbon atoms, alkoxy alkyl of one to six carbon atoms, phenyl, or a mixture thereof;

B is —($CH_2$—$CH(R^4)$—O)—, and —($CH_2$—$C(R^4)$(OH))—, or a mixture thereof, in which each $R^4$ is independently hydrogen, alkyl of one to six carbon atoms, or a mixture thereof;

n is about 5 to about 400;

T is hydrogen, alkyl of one to eight carbon atoms, phenyl, or a mixture thereof;

W is a bivalent linking group, a combination of bivalent linking groups, or a mixture of bivalent linking groups;

$R^5$ is —$Si(OR^6)_3$, an octa-substituted pentacyclooctasiloxane of the structure:

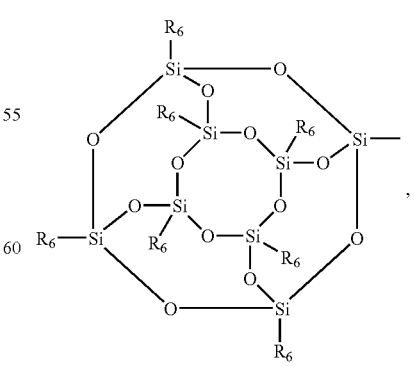

or a mixture thereof; and each $R^6$ is independently phenyl, or alkyl of one to six carbon atoms.

In another aspect, the invention is an imageable element comprising an imageable layer over a substrate, in which the imageable layer comprises the co-polymer. In another aspect, the invention is a method for forming an image by thermally imaging the imageable element and developing it to form the image.

DETAILED DESCRIPTION OF THE INVENTION

Unless the context indicates otherwise, in the specification and claims, the terms surfactant, photothermal conversion material, co-polymer, co-binder, monomer, coating solvent, and similar terms also include mixtures of such materials. Unless otherwise specified, all percentages are percentages by weight. Thermal imaging refers to imaging with a hot body, such as a thermal head, or with infrared radiation.

Co-Polymers

The co-polymers comprise three units: $A^1$, $A^2$, and C. The co-polymers comprise x wt % of the $A^1$ unit, y wt % of the $A^2$ unit, and z wt % of the C unit. x+y+z is typically about 100 wt %, preferably 100 wt %. x is typically about 30 wt % to about 98 wt %, preferably about 60 wt % to about 98 wt %, based on the weight of the co-polymer. y is typically about 1 wt % to about 50 wt %, preferably about 2 wt % to about 30 wt %, based on the weight of the co-polymer. z is typically about 1 wt % to about 50 wt %, preferably about 2 wt % to about 30 wt %, more preferably 3 wt % to 15 wt %, based on the weight of the co-polymer. The weight average molecular weight of the co-polymer is typically about 3,000 to about 1,000,000; more typically 5,000 to 500,000; even more typically 10,000 to 100,000.

The $A^1$ unit is selected from —[$CH_2C(R^1)R^2$]—, —[$CH_2CR^1(CO_2R^3)$]—, —[—CH(COYCO)CH—]—, and mixtures thereof. Each $R^1$ is independently hydrogen, alkyl of one to six carbon atoms, phenyl, substituted phenyl, halogen, cyano, or a mixture thereof. For example, the $A^1$ unit may comprise units in which $R^1$ is a mixture of hydrogen and methyl when both acrylate and methacrylate units are included in $R^1$, or, for example, $R^1$ may be a mixture of phenyl and cyano as in Examples 1–6 to 1–8). $R^2$ is hydrogen, alkyl of one to six carbon atoms, phenyl, substituted phenyl, halogen, alkoxy of one to four carbon atoms, acyl of one to five carbon atoms, acyloxy of one to five carbon atoms, allyl, or a mixture thereof. $R^3$ is hydrogen, alkyl of one to six carbon atoms, alkoxy alkyl of one to six carbon atoms, phenyl, or a mixture thereof. $R^1$ is typically hydrogen, methyl, or a mixture thereof. $R^2$ is typically phenyl, cyano, or a mixture thereof. $R^3$ is typically hydrogen, methyl, or a mixture thereof.

—[—CH(COYCO)CH—]— represents a cyclic anhydride or cyclic imide structure. That is, the first and last carbon atoms are bonded by a carbon-carbon single bond. Y is oxygen, $NR^7$, or a mixture thereof. $R^7$ is phenyl, substituted phenyl, alkyl of one to six carbon atoms, benzyl $R^7$, or a mixture of these groups. Y is typically oxygen or $NR^7$ in which $R^7$ is hydrogen, phenyl, cyclohexyl, or benzyl.

Alkyl groups of one to six carbon atoms, include, for example, methyl, ethyl, n-propyl, iso-propyl, n-butyl, iso-butyl, t-butyl, n-pentyl, iso-pentyl, neo-pentyl, n-hexyl, iso-hexyl, 1,1-dimethyl-butyl, 2,2-dimethyl-butyl, cyclopentyl, and cyclohexyl. Alkoxy alkyl groups of one to six carbon atoms include, for example, 2-ethoxyethyl, 2-methoxy ethyl, 3-methoxy propyl, and 4-ethoxybutyl. Substituted phenyl groups include, for example, 4-methylphenyl, 3-methylphenyl, 4-methoxyphenyl, 4-cyanophenyl, 4-chlorophenyl, 4-fluorophenyl, 4-acetoxyphenyl, and 3,5-dichlorophenyl. Halogen groups includes fluoro (F), chloro (Cl), and bromo (Br). Alkoxy groups of one to four carbon atoms include, for example, methoxy, ethoxy, n-propoxy, iso-propoxy, n-butoxy, and t-butoxy. Acyl groups of one to five carbon atoms include, for example, $H_3CO$— (acetyl), $CH_3CH_2CO$—, $CH_3(CH_2)_2CO$—, $CH_3(CH_2)_3CO$—, and $(CH_3)_3CCO$—. Acyloxy groups of one to five carbon atoms include, for example, $H_3CC(O)O$— (acetyloxy), $CH_3CH_2C(O)O$—, $CH_3(CH_2)_2C(O)O$—, $CH_3(CH_2)_3C(O)O$—, and $(CH_3)_3CC(O)O$—.

The $A^2$ unit is —[$CH_2$—$C(R^1)(CO_2B_nT)$]—. $R^1$ is as defined above. B is selected from —$CH_2$—$CH(R^4)$—O— and —$CH_2$—$C(R^4)(OH)$—, in which $R^4$ is hydrogen or alkyl of one to six carbon atoms. T is hydrogen, phenyl, an alkyl of one to eight carbon atoms, or a mixture thereof. Alkyl groups of one to six carbon atoms are listed above. Alkyl groups of one to eight carbon atoms additionally include, for example, n-heptyl, 2-ethylhexyl, 2,2,4-trimethylpentyl, and n-octyl. B is typically —$CH_2$—$CH(R^4)$—O— in which $R^4$ is typically hydrogen, methyl, or a mixture of hydrogen and methyl, more typically hydrogen. T is typically hydrogen, methyl, ethyl, or n-butyl. n is about 5 to about 400, typically about 10 to about 100.

C is —[$CH_2$—$C(R^1)(W$—$Si(OR^5)_3)$]—. $R^1$ is as defined above. W is a bivalent linking group, a combination of bivalent linking groups, or a mixture of bivalent linking groups. Bivalent linking groups include, for example, the carbon-silicon single bond (i.e., the C unit has the structure: —[$CH_2$—$C(R^1)$—$R^5$]—); oxygen (—O—); carbonyl (—C(O)—); carboxy (—$CO_2$—); alkylene groups containing 1 to 8 carbon atoms; and phenylene (—($C_6H_4$)—) groups, such as the o-, m-, and p-phenylene groups. Combinations of these groups may also be used. Preferred groups include the carbon-silicon single bond, the phenylene group, alkylene groups containing 2 to 6 carbon atoms (i.e., the C unit has the structure —[$CH_2$—$C(R^1)((CH_2)_{n''}R^5)$]—), in which n" is 2 to 6); and carboxy alkyl groups of the formula —$CO_2$$(CH_2)_{n''}$—, in which n" is 2 to 6 (i.e., the C unit has the structure —[$CH_2$—$C(R^1)(CO_2(CH_2)_{n''}R^5)$]—).

$R^5$ is —$Si(OR^6)_3$ or an octa-substituted pentacyclooctasiloxane (POSS) of the structure:

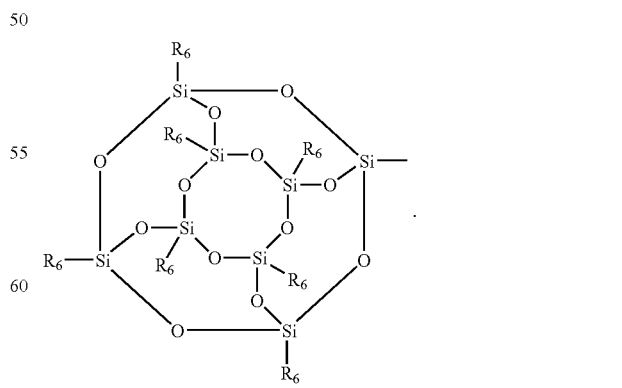

Each $R^6$ is independently phenyl, a substituted phenyl group, or an alkyl groups of one to six carbon atoms.

Substituted phenyl groups and alkyl groups of one to six carbon atoms are listed above. $R^6$ is typically methyl or ethyl, more typically methyl.

Preparation of the Co-Polymers

The co-polymers may be prepared by free radical polymerization. In a typical preparation, a mixture of three monomers, one that is the precursor of the $A^1$ unit, one that is the precursor of the $A^2$ unit, and one that is the precursor of the C unit are co-polymerized.

Free radical polymerization is well known to those skilled in the art and is described, for example, in Chapters 20 and 21, of *Macromolecules, Vol.* 2, 2nd Ed., H. G. Elias, Plenum, New York, 1984. Useful free radical initiators are peroxides such as benzoyl peroxide, hydroperoxides such as cumyl hydroperoxide and azo compounds such as 2,2'-azobis (isobutyronitrile) (AIBN). Chain transfer agents, such as dodecyl mercaptan, may be used to control the molecular weight of the compound. Suitable solvents for free radical polymerization include liquids that are inert to the reactants and which will not otherwise adversely affect the reaction, for example, esters such as ethyl acetate and butyl acetate; ketones such as methyl ethyl ketone, methyl isobutyl ketone, methyl propyl ketone, and acetone; alcohols such as methanol, ethanol, isopropyl alcohol, and butanol; ethers such as dioxane and tetrahydrofuran, and mixtures thereof. However, the co-polymers are preferably prepared in hydrophilic media (water or mixtures of water and alcohol), which form core-shell particles that disperse in the solvent. The particle size of the core-shell particles is from 10 nm to 10 microns, typically 50 nm to 1 micron, more typically 100 nm to 500 nm.

Precursors of the $A^1$ unit include, for example, styrene, 3-methyl styrene, 4-methyl styrene, 4-methoxy styrene, 4-acetoxy styrene, alpha-methyl styrene, acrylic acid, methyl acrylate, ethyl acrylate, butyl acrylate, n-hexyl acrylate, methacrylic acid, methyl methacrylate, ethyl methacrylate, n-propyl methacrylate, n-butyl methacrylate, n-pentyl methacrylate, neo-pentyl methacrylate, cyclohexyl methacrylate, n-hexyl methacrylate, 2-ethoxyethyl methacrylate, 3-methoxypropyl methacrylate, allyl methacrylate, methyl cyanoacrylate, ethyl cyanoacrylate, vinyl acetate, vinyl butyrate, methyl vinyl ketone, butyl vinyl ketone, acrylonitrile, methacrylonitrile, vinyl fluoride, vinyl chloride, vinyl bromide, maleic anhydride, maleimide, N-phenyl maleimide, N-cyclohexyl maleimide, N-benzyl maleimide, and mixtures thereof. Preferred precursors for the $A^1$ unit include styrene, methyl methacrylate, acrylonitrile, and mixtures thereof.

Precursors of the $A^2$ unit include, for example, polyethylene glycol monomethacrylate, polypropylene glycol methyl ether methacrylate, polyethylene glycol ethyl ether methacrylate, polyethylene glycol butyl ether methacrylate, polypropylene glycol hexyl ether methacrylate, polypropylene glycol octyl ether methacrylate, polyethylene glycol methyl ether acrylate, polyethylene glycol ethyl ether acrylate, polyethylene glycol phenyl ether acrylate, polypropylene glycol monoacrylate, polypropylene glycol monomethacrylate, polypropylene glycol methyl ether methacrylate, polypropylene glycol ethyl ether methacrylate, polypropylene glycol butyl ether methacrylate, poly (ethylene glycol/propylene glycol)methyl ether methacrylate, poly(vinyl alcohol) monomethacrylate, poly(vinyl alcohol)monoacrylate, and mixtures thereof. Preferred precursors for the $A^2$ unit include poly(ethylene glycol)methyl ether methacrylate, poly(ethylene glycol)acrylate, poly(propylene glycol)methyl ether methacrylate, and mixtures thereof.

Precursors of the C unit include, for example, vinyl trimethoxysilane, vinyl triethoxysilane, vinyl tributhoxysilane allyl trimethoxysilane, allyl triethoxysilane, 4-(trimethoxysilyl)-1-butene, 2-(trimethoxysilyl)ethyl acrylate, 2-(trimethoxysilyl)ethyl methacrylate, 3-(trimethoxysilyl) propyl acrylate, 3-(trimethoxysilyl)propyl methacrylate, 3-(triethoxysilyl)propyl acrylate, 3-(trimethoxysilyl)propyl methacrylate, 3-(tripropoxysilyl)propyl acrylate, 3-(tripropoxysilyl)propyl methacrylate, 3-(tributoxysilyl)propyl acrylate, 3-(tributoxysilyl)propyl methacrylate, 4-(trimethoxysilyl)butyl acrylate, 4-(trimethoxysilyl) butyl methacrylate, 5-(trimethoxysilyl)pentyl acrylate, 5-(trimethoxysilyl) pentyl methacrylate, 6-(trimethoxysilyl)hexyl acrylate, 6-(trimethoxysilyl) hexyl methacrylate, 2-(trimethoxysilyl)ethyl cyanoacrylate, 3-(trimethoxysilyl)propyl cyanoacrylate, 4-(trimethoxysilyl)-styrene, 3-(trimethoxysilyl)-styrene, 2-(trimethoxysilyl)-styrene, 4-(trimethoxysilyl)-methylstyrene, and POSS acrylate or methacrylate, in which $R^6$ is methyl or ethyl. Preferred precursors for the C unit include monomers of the structure: $CH_2=C(R^1)(CO_2(CH_2)_{n''}Si(OCH_3)_3)$, in which $R^1$ is hydrogen or methyl and $n''$ is 2 to 6, such as 2-(trimethoxysilyl)ethyl acrylate, 2-(trimethoxysilyl)ethyl methacrylate, 3-(trimethoxysilyl) propyl acrylate, 3-(trimethoxysilyl)propyl methacrylate, 4-(trimethoxysilyl)butyl acrylate, 4-(trimethoxysilyl)butyl methacrylate, 5-(trimethoxysilyl)pentyl acrylate, 5-(trimethoxysilyl)pentyl methacrylate, 6-(trimethoxysilyl)hexyl acrylate, 6-(trimethoxysilyl)hexyl methacrylate, and mixtures thereof.

Although preparation of the co-polymers has been explained in terms of monomers that can be used to form the co-polymers, this does not limit the co-polymers to those formed by polymerization of the indicated monomers. The co-polymers may be formed by other routes that will be apparent to those skilled in the art, such as by modification of precursor polymers. For example, the co-polymer may be formed by addition of a —$Si(OR^6)_3$ group, or a —W—Si$(OR^6)_3$ group, to an appropriate precursor polymer.

Imageable Element

The imageable element comprises an imageable layer over a substrate. The imageable layer comprises the co-polymer. Typically, no other layers are present in the imageable element.

Substrate

The substrate comprises a support, which may be any material conventionally used to prepare imageable elements useful as lithographic printing plates. The support is preferably strong, stable, and flexible. It should resist dimensional change under conditions of use so that color records will register in a full-color image. Typically, it can be any self-supporting material, including, for example, polymeric films such as polyethylene terephthalate film, ceramics, metals, or stiff papers, or a lamination of any of these materials. Metal supports include aluminum, zinc, titanium, and alloys thereof.

Typically, polymeric films contain a sub-coating on one or both surfaces to modify the surface characteristics to enhance the hydrophilicity of the surface, to improve adhesion to subsequent layers, to improve planarity of paper substrates, and the like. The nature of this layer or layers depends upon the substrate and the composition of subsequent layers. Examples of subbing layer materials are adhesion-promoting materials, such as alkoxysilanes, aminopropyltriethoxysilane, glycidoxypropyltriethoxysilane and epoxy functional polymers, as well as conventional subbing materials used on polyester bases in photographic films.

The surface of an aluminum support may be treated by techniques known in the art, including physical graining, electrochemical graining, chemical graining, and anodizing. The substrate should be of sufficient thickness to sustain the wear from printing and be thin enough to wrap around a cylinder in a printing press, typically about 100 μm to about 600 μm. Typically, the substrate comprises an interlayer between the aluminum support and the overlying layer or layers. The interlayer may be formed by treatment of the aluminum support with, for example, silicate, dextrine, hexafluorosilicic acid, phosphate/fluoride, polyvinyl phosphonic acid (PVPA), vinyl phosphonic acid co-polymers, or a water-soluble diazo resin.

The back side of the support (i.e., the side opposite the imageable layer) may be coated with an antistatic agent and/or a slipping layer or matte layer to improve handling and "feel" of the imageable element.

Imageable elements that are to be imaged with infrared radiation typically comprise an infrared absorber, known as a photothermal conversion material. Photothermal conversion materials absorb radiation and convert it to heat. Although a photothermal conversion material is not necessary for imaging with a hot body, imageable elements that contain a photothermal conversion material may also be imaged with a hot body, such as a thermal head or an array of thermal heads.

The photothermal conversion material may be any material that can absorb radiation and convert it to heat. Suitable materials include dyes and pigments. Suitable pigments include, for example, carbon black, Heliogen Green, Nigrosine Base, iron (III) oxide, manganese oxide, Prussian Blue, and Paris blue., The size of the pigment particles should not be more than the thickness of the layer that contains the pigment. Preferably, the size of the particles will be half the thickness of the layer or less.

The photothermal conversion material may be a dye with the appropriate absorption spectrum and solubility. Dyes, especially dyes with a high extinction coefficient in the range of 750 nm to 1200 nm, are preferred. Examples of suitable dyes include dyes of the following classes: methine, polymethine, arylmethine, cyanine, hemicyanine, streptocyanine, squarylium, pyrylium, oxonol, naphthoquinone, anthraquinone, porphyrin, azo, croconium, triarylamine, thiazolium, indolium, oxazolium, indocyanine, indotricarbocyanine, oxatricarbocyanine, phthalocyanine, thiocyanine, thiatricarbocyanine, merocyanine, cryptocyanine, naphthalocyanine, polyaniline, polypyrrole, polythiophene, chalcogenopyryloarylidene and bis(chalcogenopyrylo)polymethine, oxyindolizine, pyrazoline azo, and oxazine classes. Absorbing dyes are disclosed in numerous publications, for example, Nagasaka, EP 0,823,327; DeBoer, U.S. Pat. No. 4,973,572; Jandrue, U.S. Pat. No. 5,244,771; Patel, U.S. Pat. No. 5,208,135; and Chapman, U.S. Pat. No. 5,401,618. Other examples of useful absorbing dyes include: ADS-830A and ADS-1064 (American Dye Source, Montreal, Canada), EC2117 (FEW, Wolfen, Germany), Cyasorb IR 99 and Cyasorb IR 165 (Glendale Protective Technology), Epolite IV-62B and Epolite III-178 (Epoline), SpectralR 830A and SpectralR 840A (Spectra Colors), as well as IR Dye A, and IR Dye B, whose structures are shown below, as well as IR Dye C, whose structure is shown in the Examples.

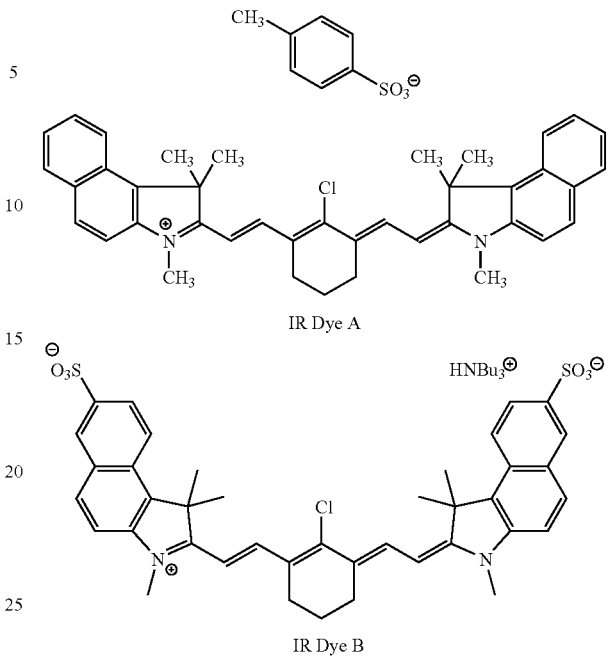

IR Dye A

IR Dye B

For imageable elements that are to be developed in water or ink and/or fountain solution, water-soluble photothermal conversion materials are preferred.

Water-soluble photothermal conversion materials include, for example, cyanine dyes which one or more sulfate and/or sulfonate groups. Other infrared absorbing cyanine anions that contain two to four sulfonate groups are disclosed, for example, in West, U.S. Pat. No. 5,107,063; Pearce, U.S. Pat. No. 5,972,838; Chapman, U.S. Pat. No. 6,187,502; Fabricius, U.S. Pat. No. 5,330,884; and Japanese Laid Open Application No. 63-033477. The preparation of cyanine dyes with polysulfonate anions is disclosed, for example, in U.S. patent application Ser. No. 10/722,257, filed Nov. 25, 2003, incorporated herein by reference. The preparation of N-alkyl sulfate cyanine compounds is disclosed, for example, in U.S. patent application Ser. No. 10/736,364, filed Dec. 15, 2003, incorporated herein by reference.

The amount of photothermal conversion present in the element is generally sufficient to provide an optical density of at least 0.05, and preferably, an optical density of from about 0.5 to at least about 2 to 3 at the imaging wavelength. As is well known to those skilled in the art, the amount of compound required to produce a particular optical density at a particular wavelength can be determined using Beer's law.

Imageable Layer

The imageable layer is over the substrate, typically on the substrate. In one aspect, the co-polymer and the photothermal conversion material are the only essentially ingredients of the imageable layer. A surfactant, such as a fluorinated surfactant or a polyethoxylated dimethylpolysiloxane co-polymer, or a mixture of surfactants may be present to help disperse the other ingredients in a coating solvent.

In another aspect, the imageable layer may comprise one of more co-binders in addition to the infrared absorbing compound. The co-binder may be a water-soluble or water-dispersible polymer, such as, a cellulose derivative such as carboxymethyl cellulose, methyl cellulose, hydroxy propyl methyl cellulose, hydroxy propyl cellulose, hydroxy ethyl cellulose; polyvinyl alcohol; polyacrylic acid; polymethacrylic acid; polyvinyl pyrrolidone; polylactide; polyvinyl phosphonic acid; a synthetic co-polymer, such as a co-polymer of an alkoxy polyethylene glycol acrylate or methacrylate, for example methoxy polyethylene glycol acrylate or methacrylate, with a monomer such as methyl methacrylate, methyl acrylate, butyl methacrylate, butyl acrylate, or allyl methacrylate; or a mixture thereof. In this aspect, the imageable layer typically comprises about 30 wt % to about 99.5 wt %, more typically 50 wt % to about 90 wt %, of the co-polymer; about 0.5 wt % to about 30 wt %, more typically 1 wt % to about 15 wt %, of the photothermal conversion material; about 0 wt % to about 50 wt %, more typically about 0.1 wt % to about 30 wt % of the water soluble binder; and 0 wt % to about 10 wt %, more typically 0.1 wt % to about 5 wt %, of other ingredients, such as a surfactant or a mixture of surfactants.

In another aspect of the invention, the infrared absorbing compound is used as a binder in an infrared sensitive free radical polymerizable composition. Negative working free radical polymerizable compositions comprise a monomer, an initiator system, and, a binder. These compositions are well known to those skilled in the art and are described, for example, in *Photoreactive Polymers: The Science and Technology of Resists*, A. Reiser, Wiley, New York, 1989, pp. 102–177; in "Photopolymers: Radiation Curable Imaging Systems," by B. M. Monroe, in *Radiation Curing: Science and Technology*, S. P. Pappas, Ed., Plenum, New York, 1992, pp. 399–440; and "Polymer Imaging" by A. B. Cohen and P. Walker, in *Imaging Processes and Material*, J. M. Sturge, et al., Eds, Van Nostrand Reinhold, New York, 1989, pp. 226–262.

Free radical polymerizable compositions comprise an initiator system, that is a compound or compounds that generates free radical when the imageable element is thermally imaged. Thermally sensitive free radical generators include, for example, peroxides such as benzoyl peroxide; hydroperoxides such as cumyl hydroperoxide; azo compounds such as AIBN; 2,4,5-triarylimidazolyl dimers (HABIs) such as are disclosed in Dueber, U.S. Pat. No. 4,565,769; onium salts, for example, diazonium salts, iodonium salts, sulfonium salts, phosphonium salts, and pyridinium salts; and mixtures thereof. The use of sulfonium salts to initiate free radical polymerization is disclosed, for example, in E. Takahashi, et al., *J. Appl. Poly. Sci.*, 91, 589–597 (2004), and E. Takahashi, et al., *J. Poly. Sci.*, Part A: Polymer Chemistry, 41, 3816–3827 (2003). Diaryliodonium salts and triarylsulfonium salts are preferred onium salts.

Free radical polymerizable compositions comprise at least one ethylenically unsaturated compound that undergoes free-radical initiated polymerization, generally known as a monomer. The monomers are typically multifunctional, i.e., they comprise more than one ethylenically unsaturated, free radical polymerizable group. Typical multifunctional monomers are unsaturated esters of alcohols, preferably acrylate and methacrylate esters of polyols. Oligomers and/or pre-polymers, such as urethane acrylates and methacrylates, epoxide acrylates and methacrylates, polyester acrylates and methacrylates, polyether acrylates and methacrylates and unsaturated polyester resins, may also be used. Numerous other unsaturated monomers polymerizable by free-radical initiated polymerization and useful in polymerizable compositions are known to those skilled in the art.

In addition to the co-polymer, the imageable layer may comprise one or more co-binders. Typical co-binders are water-soluble or water-dispersible polymers, such as, cellulose derivatives such as carboxymethyl cellulose, methyl cellulose, hydroxy propyl methyl cellulose, hydroxy propyl cellulose, hydroxy ethyl cellulose; polyvinyl alcohol; polyacrylic acid; polymethacrylic acid; polyvinyl pyrrolidone; polylactide; polyvinyl phosphonic acid; synthetic co-polymers, such as the co-polymer of an alkoxy polyethylene glycol acrylate or methacrylate, for example methoxy polyethylene glycol acrylate or methacrylate, with a monomer such as methyl methacrylate, methyl acrylate, butyl methacrylate, butyl acrylate, or allyl methacrylate; and mixtures thereof. Other conventional ingredients, such as surfactants and contrast dyes, may also be present.

The free radical polymerizable composition typically comprises about 40 wt % to about 90 wt %, preferably about 50 wt % to about 85wt %, of the co-polymer; about 0.1 wt % to about 30 wt %, preferably about 1 wt % to about 15 wt %, of the photothermal conversion material; 0 wt % to about 50 wt %, preferably about 1 wt % to about 30 wt %, of the co-binder; about 0.01 wt % to about 20 wt %, preferably about 0.1 wt % to about 10 wt %, of the initiator system; about 0.1 wt % to about 50 wt %, preferably about 1 wt % to about 30 wt %, of the monomer; and about 0 wt % to about 20 wt %, preferably about 0 wt % to about 5 wt %, of the other ingredients.

Preparation of the Imageable Elements

The imageable elements may be prepared by applying the imageable layer over the hydrophilic surface of the substrate using conventional techniques. The imageable layer may be applied by any conventional method, such as coating or lamination. Typically the ingredients of the imageable layer are dispersed or dissolved in a suitable coating solvent, such as water or a mixture of water and an organic solvent such as methanol, ethanol, iso-propyl alcohol, and/or acetone, and the resulting mixture coated by conventional methods, such as spin coating, bar coating, gravure coating, die coating, slot coating, or roller coating. After coating, the layer is dried to remove the coating solvent. The resulting element may be air dried at ambient temperature or at an elevated temperature, such as at about 65° C. for about 20 seconds in an oven. Alternatively, the resulting imageable element may be dried by blowing warm air over the element. The coating weight for the imageable layer is typically about 0.5 g/m$^2$ to about 2.5 g/m$^2$, preferably about 1 g/m$^2$ to about 1.5 g/m$^2$.

Imaging and Processing of the Imageable Elements

The imageable elements may be thermally imaged with a laser or an array of lasers emitting modulated near infrared or infrared radiation in a wavelength region that is absorbed by the imageable element. Infrared radiation, especially infrared radiation in the range of about 800 nm to about 1200 nm, is typically used for imaging. Imaging is conveniently carried out with a laser emitting at about 830 nm, about 1056 nm, or about 1064 nm. Suitable commercially available imaging devices include image setters such as the CREO® Trendsetter (Creo, Burnaby, British Columbia, Canada), the Screen PlateRite model 4300, model 8600, and model 8800 (Screen, Rolling Meadows, Chicago, Ill., USA), and the Gerber Crescent 42T (Gerber).

Alternatively, the imageable element may be thermally imaged using a hot body, such as a conventional apparatus containing a thermal printing head. A suitable apparatus includes at least one thermal head but would usually include a thermal head array, such as a TDK Model No. LV5416 used in thermal fax machines and sublimation printers, the GS618–400 thermal plotter (Oyo Instruments, Houston, Tex., USA), or the Model VP-3500 thermal printer (Seikosha America, Mahwah, N.J., USA).

Imaging produces an imaged element, which comprises a latent image of imaged regions and complementary unimaged regions. Development of the imaged element to form a printing plate, or printing form, converts the latent image to an image by removing the unimaged regions, revealing the hydrophilic surface of the underlying substrate. The imaged element is washed with an aqueous liquid, such as water or fountain solution, either on press or in a conventional rinse/gum apparatus. This process removes the imaged regions, but does not remove the complementary imaged regions.

The imaged imageable element may be developed in water. Although distilled or deionized water may be used, the imaged element typically can be developed in tap water. Although development with tap water will typically be carried out in a separate processor, rather than on press, it is not necessary to prepare and dispose of expensive, high pH developers when water is used. In addition, only a simple processor is necessary so expensive processors are not required to develop the imaged imageable element in water.

Alternatively, the imaged imageable element can be directly mounted on press after imaging and developed with fountain solution during the initial prints. No separate development step is needed before mounting on press. This eliminates the separate development step along with both the processor and developer, thus simplifying the printing process and reducing the amount of expensive equipment required. The imaged imageable element is mounted on the plate cylinder of a lithographic press and developed with fountain solution by rotating the press cylinders and contacting the element with fountain solution.

Numerous aqueous fountain solutions are known to those skilled in the art. Fountain solutions are disclosed, for example, in Matsumoto, U.S. Pat. No. 5,720,800; Archer, U.S. Pat. No. 5,523,194; Chase, U.S. Pat. No. 5,279,648; Bondurant, U.S. Pat. Nos. 5,268,025, 5,336,302, and 5,382,298; Egberg, U.S. Pat. No. 4,865,646; and Daugherty, U.S. Pat. No. 4,604,952. Typical ingredients of aqueous fountain solutions, in addition to water, typically deionized water, include pH buffering systems, such as phosphate and citrate buffers; desensitizing agents, such as dextrin, gum arabic, and sodium carboxymethylcellulose; surfactants and wetting agents, such as aryl and alkyl sulfonates, polyethylene oxides, polypropylene oxides, and polyethylene oxide derivatives of alcohols and phenols; humectants, such as glycerin and sorbitol; low boiling solvents such as ethanol and 2-propanol; sequestrants, such as borax, sodium hexametaphosphate, and salts of ethylenediamine tetraacetic acid; biocides, such as isothiazolinone derivatives; and antifoaming agents. Typical pH ranges for fountain solutions are: about 3.7 to about 6.7 for sheet fed presses, and about 7.0 to about 9.6 for web presses.

In conventional wet press lithographic printing, fountain solution and then ink are applied to the printing plate. For presses with integrated inking/dampening system, the ink and fountain solution are emulsified by various press rollers before being transferred to the plate as emulsion of ink and fountain solution. However, in this invention, the ink and fountain solution may be applied in any combination or sequence, as needed for the plate.

For on-press imaging, the imageable element is imaged while mounted on a lithographic printing press cylinder, and the imaged imageable element is developed on press with fountain solution during the initial press operation. This method does not comprise a separate development step. This method is especially suitable for computer-to-press applications in which the imageable element (or elements, for multiple color presses) is directly imaged on the plate cylinder according to computer generated digital imaging information and, with minimum or no treatment, directly prints out regular printed sheets. On-press imaging may be carried out on, for example, a Quickmaster DI 464 press (Heidelberger Druckmaschinen, Heidelberg, Germany).

INDUSTRIAL APPLICABILITY

The imageable elements of the invention can be developed with water or on press using fountain solution as the developer thus avoiding the costs associated with the use of aqueous alkaline developers. Once the imageable element has been imaged and developed to form a lithographic printing plate, printing can then be carried out by applying a fountain solution and then lithographic ink to the image on its surface. The fountain solution is taken up by the unimaged regions, i.e., the surface of the hydrophilic substrate revealed by the imaging and development process, and the ink is taken up by the imaged regions, i.e., the regions not removed by the development process. The ink is then transferred to a suitable receiving material (such as cloth, paper, metal, glass or plastic) either directly or indirectly using an offset printing blanket to provide a desired impression of the image thereon.

The advantageous properties of this invention can be observed by reference to the following examples, which illustrate but do not limit the invention.

EXAMPLES

Except where indicated, the indicated percentages are percentages by weight based on the total solids in the coating solution.

Glossary

AIBN 2,2'-Azobisisobutyronitrile (DuPont, Wilmington, Del., USA)
AN Acrylonitrile (Aldrich, Milwaukee, Wis., USA)
BYK 336 Modified dimethyl polysiloxane co-polymer in a 25% xylene/methoxypropyl acetate solution (Byk Chemie (Wallingford, Conn., USA)
CREO® Trendsetter 3230 Commercially available platesetter, using Procom Plus software and operating at a wavelength of 830 nm (Creo Products, Burnaby, BC, Canada)
DESMODUR® N 100 Solvent-free, aliphatic polyisocyanate polymer based on hexamethylene diisocyanate (Bayer, Milford, Conn., USA)
IR Dye C See structure below
IRGACUREO® 250 75% solution of iodonium, (4-methoxyphenyl)[4-(2-methylpropyl)phenyl]-, hexafluorophosphate in propylene carbonate (Ciba Specialty Chemicals, Tarrytown, N.Y., USA)
KLUCEL® M 2% Hydroxypropyl cellulose in water (Hercules, Heverlee, Belgium)
LODYNE® 103A Fluorosurfactant, (Ciba Specialty Chemicals, Tarrytown, N.Y., USA)
Mercapto-3-traizole Mercapto-3-triazole-1H, 2, 4 (PCAS, Paris, France)
PEGMA Poly(ethyleneglycol)methyl ether methacrylate, 50% wt in water, MW=2,000 (Aldrich, Milwaukee, Wis., USA)
Substrate A 0.3 mm gauge, aluminum sheet which had been electrograined, anodized and treated with a solution of inorganic phosphate
TMSPMA 3-(Trimethoxysilyl) propyl methacrylate (Aldrich, Milwaukee, Wis., USA)
Urethane Acrylate 80% 2-butanone solution of a urethane acrylate obtained by reaction of DESMODUR® N100 and hydroxyethyl acrylate and pentaerythritol triacrylate
VTES Vinyl triethoxysilane (Aldrich, Milwaukee, Wis., USA)

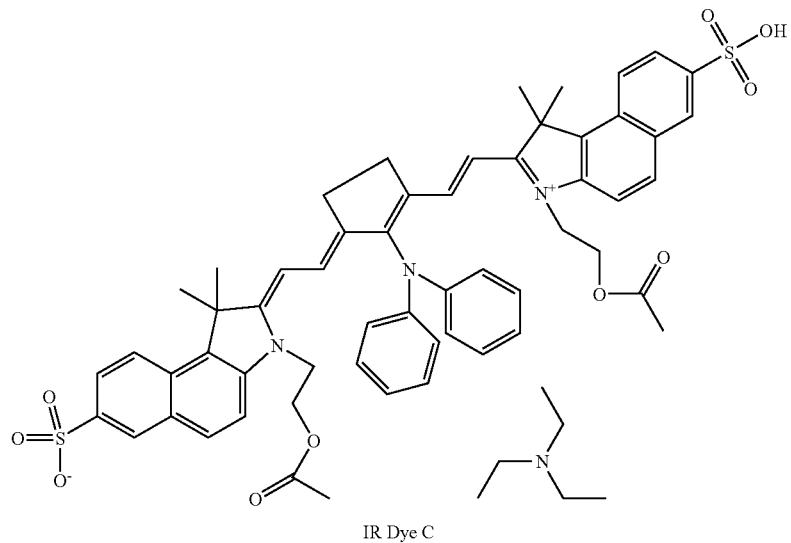

IR Dye C

Example 1

This example illustrates the synthesis of co-polymers of the invention. 10.0 g of PEGMA (50% in water) and a total of 160 g of water and 1-propanol as shown in Table 1 were placed in a 250-ml 3-necked flask equipped with a reflux condenser, magnetic stirrer, temperature controller, and nitrogen inlet. The mixture was heated to 80° C. under nitrogen for 0.5 hr. A solution of 0.4 g of AIBN in a mixture of the monomers as shown in Table 1 was added in small portions over 1 hr. The reaction mixture was stirred at 80° C. under nitrogen for additional 5 hr and cooled to room temperature. 200 g of a dispersion of the co-polymer was obtained with a non-volatile composition of 19.3%.

The composition of the co-polymers is shown in Table 1. Particle size was measured with ultrafine particle size analyzer (UPA150) (Microtrac, North Largo, Fla., USA). ma is the mean diameter, in microns, of the area distribution. mv is the mean diameter, in microns, of the volume distribution (n/a=not determined).

coating solution, which was delivered to the substrate by a pump. The coated substrate was dried by blowing hot air at 65° C. for about 2 minutes over the substrate to yield a printing plate precursor. The dry coating weight of the imageable layer was about 1.54 g/m².

The resulting imageable element was imaged on the CREO® TRENDSETTER 3244× image setter with 830 nm infrared laser radiation at a power of 12 W and a range of drum speeds from 210 to 50 rpm (corresponding to exposure energies ranging from 130 to 540 mJ/cm²). The imaged precursor was developed in tap water to remove unimaged regions of the imageable layer. The minimum exposure energy to achieve a good image was about 200 mJ/cm².

A second imageable element was imaged at 400 mJ/cm² and then mounted directly on an A. B. Dick 9870 Duplicator Press (A. B. Dick, Niles, Ill., USA). The press was charged with Van Son Rubber Base black Ink (Van Son Ink, Mineola, N.Y., USA). The aqueous fountain solution contained about 23.5 ml/L (3 oz per gallon) Varn Litho Etch142W (Varn International, Addison, Ill., USA), and about 23.5 ml/L (3 oz

TABLE 1

| Example | monomers (wt %) | | | | | Solvent (wt %) | | particle size (nm) | | |
|---|---|---|---|---|---|---|---|---|---|---|
| | PEGMA | Styrene | TMSPMA | AN | VTES | n-Pr | water | Dia (nm) | ma | mv |
| 1-1 | 10 | 80 | 10 | | | 80 | 20 | 210 | 195 | 300 |
| 1-2 | 10 | 80 | 10 | | | 50 | 50 | 238 | 166 | 292 |
| 1-3 | 10 | 85 | 5 | | | 50 | 50 | 249 | 226 | 299 |
| 1-4 | 10 | 85 | 5 | | | 60 | 40 | 206 | 192 | 233 |
| 1-5 | 10 | 85 | 5 | | | 70 | 30 | 170 | 195 | 239 |
| 1-6 | 10 | 10 | 5 | 75 | | 50 | 50 | 300 | 150 | 227 |
| 1-7 | 10 | 10 | 5 | 75 | | 80 | 20 | 187 | 170 | 157 |
| 1-8 | 10 | 20 | | 60 | 10 | 80 | 20 | n/a | n/a | n/a |

Example 2

A coating solution was prepared by combining 32.5 g of the co-polymer from Example 1–3, 0.37 g of Dye C, 0.2 g of 10% LODYNE 103A, and 67 g of water. Substrate A was mounted on a hot rotating drum and contacted with the per gallon) Varn PAR (alcohol substitute) in water. The imaged imageable element was developed in fountain solution to yield a printable lithographic printing plate. Typically, the developing procedure was 20 revolutions of the plate cylinder with the damping system engaged and 20 revolutions of the plate cylinder with both the damping system and the inking system engaged. A printing plate that printed at least 250 copies of good prints was produced.

Example 3

Following the procedure of Example 2, a coating solution containing 35.9 g the co-polymer formed in Example 1–7, 0.37 g of Dye C, 0.2 g of 10% LODYNE 103A, and 63 g of water was coated onto Substrate A. The dry coating weight of the imageable layer was about 1.54 g/m².

The resulting imageable element was imaged and developed as in Example 2. The minimum exposure energy to achieve a good image was about 250 mJ/cm².

A second imageable element was imaged and developed on an A. B. Dick Press as in Example 2. The plate printed at least 250 copies of good prints.

Example 4

Following the procedure of Example 2, a coating solution containing 32.4 g the co-polymer formed in Example 1–5, 0.37 g of Dye C, 0.2 g of 10% LODYNE 103A, and 67 g of water was coated onto Substrate A. The dry coating weight of the imageable layer was about 1.54 g/m².

The resulting imageable element was imaged at 400 mJ/cm² and mounted on an A. B. Dick Press as in Example 2. The imaged imageable element was developed in fountain solution to yield a printable plate, but ink was picked up on non-imaging area.

Example 5

The solution described in Table 2 was coated onto a substrate using a wire-wound rod and then dried for approximately 90 sec in a Ranar conveyor oven set at 90° C. The dry coating weight of the imageable layer was 0.5 g/m². One imageable element was prepared on a brush-grained and phosphoric acid anodized aluminum substrate that had been post-treated with polyacrylic acid. A second imageable element was prepared on an electrochemically-grained and sulfuric acid anodized aluminum substrate that had been post-treated with poly(vinyl phosphonic acid).

TABLE 2

| Component | Parts by Weight |
|---|---|
| Urethane Acrylate | 2.48 |
| Co-polymer 1–3 | 19.67 |
| IRAGACURE ® 250 | 0.42 |
| Dye C | 0.13 |
| Mercapto-3-triazole | 0.18 |
| BYK 336 | 0.60 |
| KLUCEL ® M | 3.31 |
| n-Propanol | 60.95 |
| Water | 12.26 |

The resulting imageable elements were imaged as in Example 2 at 75, 150 and 250 mJ/cm². The imaged imageable elements were mounted on an A. B. Dick and evaluated as in Example 2. Each of the resulting printing plates each printed at least 250 good quality prints.

Having described the invention, we now claim the following and their equivalents.

What is claimed is:

1. A co-polymer comprising x wt % of $A^1$ units, based on the weight of the co-polymer, y wt % of $A^2$ units, based on the weight of the co-polymer, and z wt % of C units, based on the weight of the co-polymer, in which:

x is about 30 wt % to about 98 wt %, y is about 1 wt % to 50 wt %; z is about 1 wt % to about 50 wt %, and x+y+z is 100%;

(i) $A^1$ is selected from —[$CH_2$—$C(R^1)R^2$]—, —[$CH_2$—$CR^1(CO_2R^3)$]—, —[—($CH$—$CO$—$Y$—$CO$—$CH$)—]—, and mixtures thereof;

(ii) $A^2$ is —[$CH_2$—$C(R^1)(CO_2B_nT)$]—; and (iii) C is —[$CH_2$—$C(R^1)(W$—$R^5)$]— each $R^1$ is independently hydrogen, alkyl of one to six carbon atoms, phenyl, substituted phenyl, halogen, cyano, or a mixture thereof;

$R^2$ is hydrogen, alkyl of one to six carbon atoms, phenyl, substituted phenyl, halogen, alkoxy of one to four carbon atoms, acyl of one to five carbon atoms, acyloxy of one to five carbon atoms, allyl, or a mixture thereof;

Y is —O— or —$N(R^7)$—, in which $R^7$ is phenyl, substituted phenyl, alkyl of one to six carbon atoms, benzyl, or a mixture thereof;

$R^3$ is hydrogen, alkyl of one to six carbon atoms, alkoxyalkyl of one to six carbon atoms, phenyl, or a mixture thereof;

B is —($CH_2$—$CH(R^4)$—O)—, —($CH_2$—$C(R^4)(OH)$)—, or a mixture thereof, in which each $R^4$ is independently hydrogen, alkyl of one to six carbon atoms, or a mixture thereof;

n is about 5 to about 400;

T is hydrogen, alkyl of one to eight carbon atoms, phenyl, or a mixture thereof;

W is a carbon-silicon single bond, a phenylene group, a —($CH_2$)$_{n''}$— group in which n" is 2 to 6, or a mixture of these linking groups;

$R^5$ is —$Si(OR^6)_3$, an octa-substituted pentacyclooctasiloxane of the structure:

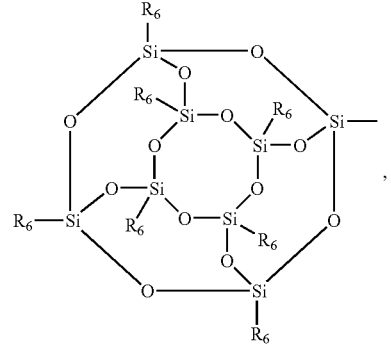

or a mixture thereof; and each $R^6$ is independently phenyl, or alkyl of one to six carbon atoms.

2. The co-polymer of claim 1 in which:

$A^1$ is selected from —[$CH_2$—$C(R^1)R^2$]—, —[$CH_2$—$CR^1(CO_2R^3)$]—, and mixtures thereof;

$R^1$ is hydrogen or methyl;

$R^2$ is phenyl or cyano; and $R^3$ is hydrogen or methyl.

3. The co-polymer of claim 1 in which:

$R^1$ is hydrogen or methyl;

B is —($CH_2$—$CH(R^4)$—O)—;

each $R^4$ is independently hydrogen or methyl; and n is about 10 to about 100.

4. The co-polymer of claim 1 in which:

W is a carbon-silicon single bond a phenylene group, or a mixture thereof.

5. The co-polymer of claim 1 in which:

$A^1$ is selected from —[$CH_2$—$C(R^1)R^2$]—, —[$CH_2$—$CR^1(CO_2R^1)$]—, and mixtures thereof;

$R^1$ is hydrogen or methyl;
$R^2$ is phenyl or cyano;
$R^3$ is hydrogen or methyl;
B is —(CH$_2$—CH(R$^4$)—O)—;
each $R^4$ is independently hydrogen or methyl;
n is about 10 to about 100;
$R^5$ is —Si(OR$^6$)$_3$; and
$R^6$ is methyl.

6. The co-polymer of claim 5 in which x is about 60 wt % to about 98 wt %; y is about 2 wt % to about 30 wt %; and z is about 1 wt % to about 50 wt %.

7. The co-polymer of claim 6 in which $R^3$ is methyl; and $R^4$ is hydrogen.

8. An imageable element comprising an imageable layer on a substrate, in which the imageable layer comprises an IR absorbing dye and a co-polymer comprising x wt % of $A^1$ units, based on the weight of the co-polymer, y wt % of $A^2$ units, based on the weight of the co-polymer, and z wt % of C units, based on the weight of the co-polymer, in which:
x is about 30 wt % to about 98 wt %, y is about 1 wt % to 50 wt %; z is about 1 wt % to about 50 wt %, and x+y+z is 100%;
(i) $A^1$ is selected from —[CH$_2$—C(R$^1$)R$^2$]—, —[CH$_2$—CR$^1$(CO$_2$R$^3$)]—, —[—(CH—CO—Y—CO—CH)—]—, and mixtures thereof;
(ii) $A^2$ is —[CH$_2$—C(R$^1$)(CO$_2$B$_n$T)]—; and
(iii) C is —[CH$_2$—C(R$^1$)(W—R$^5$)]—
each $R^1$ is independently hydrogen, alkyl of one to six carbon atoms, phenyl, substituted phenyl, halogen, cyano, or a mixture thereof;
$R^2$ is hydrogen, alkyl of one to six carbon atoms, phenyl, substituted phenyl, halogen, alkoxy of one to four carbon atoms, acyl of one to five carbon atoms, acyloxy of one to five carbon atoms, allyl, or a mixture thereof;
Y is —O— or —N(R$^7$)—, in which $R^7$ is phenyl, substituted phenyl, alkyl of one to six carbon atoms, benzyl, or a mixture thereof;
$R^3$ is hydrogen, alkyl of one to six carbon atoms, alkoxy alkyl of one to six carbon atoms, phenyl, or a mixture thereof;
B is —(CH$_2$—CH(R$^4$)—O)—, and —(CH$_2$—C(R$^4$)(OH))—, or a mixture thereof, in which each $R^4$ is independently hydrogen, alkyl of one to six carbon atoms, or a mixture thereof;
n is about 5 to about 400;
T is hydrogen, alkyl of one to eight carbon atoms, phenyl, or a mixture thereof;
W is a bivalent linking group, a combination of bivalent linking groups, or a mixture of bivalent linking groups;
$R^5$ is —Si(OR$^6$)$_3$, an octa-substituted pentacyclooctasiloxane of the structure:

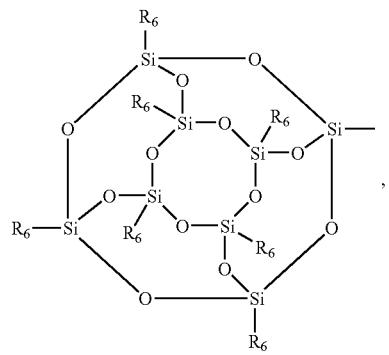

or a mixture thereof; and
each $R^6$ is independently phenyl, or alkyl of one to six carbon atoms.

9. The imageable element of claim 8 in which:
$A^1$ is selected from —[CH$_2$—C(R$^1$)R$^2$]—, —[CH$_2$—CR$^1$(CO$_2$R$^3$)]—, and mixtures thereof;
$R^1$ is hydrogen or methyl;
$R^2$ is phenyl or cyano; and
$R^3$ is hydrogen or methyl.
B is —(CH$_2$—CH(R$^4$)—O)—;
each $R^4$ is independently hydrogen or methyl;
n is about 10 to about 100;
W is a carbon-silicon single bond, phenylene, —(CH$_2$))$_{n''}$—, or —CO$_2$(CH$_2$)$_{n''}$—, in which n" is 2 to 6;
$R^5$ is —Si(OR$^6$)$_3$; and
$R^6$ is methyl.

10. The imageable element of claim 9 in which x is about 60 wt % to about 98 wt %; y is about 2 wt % to about 30 wt %; and z is about 1 wt % to about 50 wt %; and in which W is —CO$_2$(CH$_2$)$_{n''}$—, $R^3$ is methyl; and $R^4$ is hydrogen.

11. The imageable element of claim 10 in which the imageable layer consists essentially of the IR absorbing dye and the co-polymer.

12. The imageable element of claim 10 in which the imageable layer comprises the IR absorbing dye, the co-polymer, and a co-binder.

13. The imageable element of claim 10 in which the imageable layer comprises the IR absorbing dye, the co-polymer, a free radical polymerizable monomer, and an initiator system.

14. A method for forming an image, the method comprising the steps of:
a) thermally imaging an imageable element comprising an imageable layer on a substrate and forming an imaged imageable element comprising imaged and unimaged regions in the imageable layer;
b) developing the imaged imageable element with a developer and removing the unimaged regions and forming the image,
in which:
the imageable layer comprises a photothermal conversion material and a co-polymer comprising x wt % of $A^1$ units, based on the weight of the co-polymer, y wt % of $A^2$ units, based on the weight of the co-polymer, and z wt % of C units, based on the weight of the co-polymer, in which:
x is about 30 wt % to about 98 wt %, y is about 1 wt % to 50 wt %; z is about 1 wt % to about 50 wt %, and x+y+z is 100%;
(i) $A^1$ is selected from —[CH$_2$—C(R$^1$)R$^2$]—, —[CH$_2$—CR$^1$(CO$_2$R$^3$)]—, —[—(CH—CO—Y—CO—CH)—]—, and mixtures thereof;
(ii) $A^2$ is —[CH$_2$—C(R$^1$)(CO$_2$B$_n$T)]—; and
(iii) C is —[CH$_2$—C(R$^1$)(W—R$^5$)]—
each $R^1$ is independently hydrogen, alkyl of one to six carbon atoms, phenyl, substituted phenyl, halogen, cyano, or a mixture thereof;
$R^2$ is hydrogen, alkyl of one to six carbon atoms, phenyl, substituted phenyl, halogen, alkoxy of one to four carbon atoms, acyl of one to five carbon atoms, acyloxy of one to five carbon atoms, allyl, or a mixture thereof;
Y is —O— or —N(R$^7$)—, in which $R^7$ is phenyl, substituted phenyl, alkyl of one to six carbon atoms, benzyl, or a mixture thereof;
$R^3$ is hydrogen, alkyl of one to six carbon atoms, alkoxyalkyl of one to six carbon atoms, phenyl, or a mixture thereof;
B is —(CH$_2$—CH(R$^4$)—O)—, and —(CH$_2$—C(R$^4$)(OH))—, or a mixture thereof, in which each $R^4$ is independently hydrogen, alkyl of one to six carbon atoms, or a mixture thereof;

n is about 5 to about 400;

T is hydrogen, alkyl of one to eight carbon atoms, phenyl, or a mixture thereof;

W is a bivalent linking group, a combination of bivalent linking groups, or a mixture of bivalent linking groups;

$R^5$ is —Si(OR$^6$)$_3$, an octa-substituted pentacyclooctasiloxane of the structure:

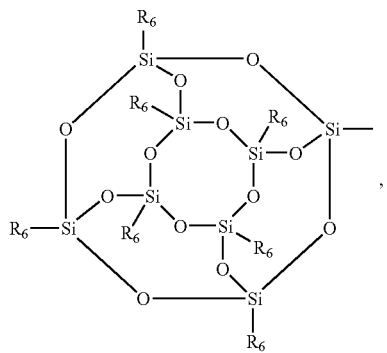

or a mixture thereof; and each $R^6$ is independently phenyl, or alkyl of one to six carbon atoms.

15. The method of claim 14 in which imaging is carried out with infrared radiation.

16. The method of claim 15 in which:

$A^1$ is selected from —[CH$_2$—C(R$^1$)R$^2$]—, —[CH$_2$—CR$^1$(CO$_2$R$^3$)]—, and mixtures thereof;

$R^1$ is hydrogen or methyl;

$R^2$ is phenyl or cyano; and $R^3$ is hydrogen or methyl.

B is —(CH$_2$—CH(R$^4$)—O)—;

each $R^4$ is independently hydrogen or methyl;

n is about 10 to about 100;

W is a carbon-silicon single bond, phenylene, —(CH$_2$)$_{n''}$—, or —CO$_2$(CH$_2$)$_{n''}$—, in which n″ is 2 to 6;

$R^5$ is —Si(OR$^6$)$_3$; and $R^6$ is methyl.

17. The method of claim 16 in which x is about 60 wt % to about 98 wt %; y is about 2 wt % to about 30 wt %; and z is about 1 wt % to about 50 wt %; and in which W is —CO$_2$(CH$_2$)$_{n''}$—, $R^3$ is methyl; and $R^4$ is hydrogen.

18. The method of claim 16 in which the developer is water or a fountain solution.

19. The method of claim 18 in which step a) and step b) are both carried out on press.

20. The method of claim 18 in which the imageable layer consists essentially of the photothermal conversion material and the co-polymer.

21. The method of claim 18 in which the imageable layer comprises the photothermal conversion material, the co-polymer, and a co-binder.

22. The method of claim 18 in which the imageable layer comprises the photothermal conversion material, the co-polymer, a free radical polymerizable monomer, and an initiator system.

23. The method of claim 15 in which the developer is a fountain solution and step b) is carried out on press.

24. The method of claim 23 in which:

$A^1$ is selected from —[CH$_2$—C(R$^1$)R$^2$]—, —[CH$_2$—CR$^1$(CO$_2$R$^3$)]—, and mixtures thereof;

$R^1$ is hydrogen or methyl;

$R^2$ is phenyl or cyano; and $R^3$ is hydrogen or methyl.

B is —(CH$_2$—CH(R$_4$)—O)—;

each $R^4$ is independently hydrogen or methyl;

n is about 10 to about 100;

W is a carbon-silicon single bond, phenylene, —(CH$_2$)$_{n''}$—, or —CO$_2$(CH$_2$)$_{n''}$—, in which n″ is 2 to 6;

$R^5$ is —Si(OR$^6$)$_3$; and $R^6$ is methyl.

25. The method of claim 24 in which x is about 60 wt % to about 98 wt %; y is about 2 wt % to about 30 wt %; and z is about 1 wt % to about 50 wt %; and in which W is —CO$_2$(CH$_2$)$_{n''}$—, $R^3$ is methyl; and $R^4$ is hydrogen.

26. The method of claim 25 in which the imageable layer comprises the photothermal conversion material, the co-polymer, and a co-binder.

27. The method of claim 25 in which the imageable layer comprises the photothermal conversion material, the co-polymer, a free radical polymerizable monomer, and an initiator system.

* * * * *